April 7, 1931. J. FARLEY ET AL 1,799,892
TRANSMISSION MECHANISM FOR MOTOR VEHICLES AND THE LIKE
Filed July 11, 1929 2 Sheets-Sheet 2

Inventors.
James Farley and
Joseph Maina.
Per Sydney E. Page.
Attorney

Patented Apr. 7, 1931

1,799,892

UNITED STATES PATENT OFFICE

JAMES FARLEY, OF HERTFORD, AND JOSEPH MAINA, OF LONDON, ENGLAND; SAID MAINA ASSIGNOR TO SAID FARLEY

TRANSMISSION MECHANISM FOR MOTOR VEHICLES AND THE LIKE

Application filed July 11, 1929, Serial No. 377,533, and in Great Britain August 21, 1928.

This invention relates to transmission mechanism for motor vehicles and has more especial reference to variable speed gear boxes customarily employed on motor vehicles.

In Farley's patent application Serial No. 183,867, filed April 14, 1927, a friction clutch employing wedging members is disclosed, the wedging members being located between a polygonal driving member and a concentric cylindrically faced driven member in cages, the cages being spring urged to direct the wedging members to coupling position registering means controlling said cages to withdraw the wedging members from coupling position and permit free relative rotation between the driving and driven members.

In one form of variable speed gear box heretofore proposed, a friction clutch controlled from the gear change lever is interposed between the rear axle and the gears, so that each time the gear lever is moved to effect a change in the drive, the friction clutch is uncoupled to interrupt transmission through the gear box and allow a particular gear to be engaged with the torque removed from the gear shafts, while in another form the driving shaft is coaxial with the driven shaft which is normally driven through change gears on a lay shaft having a pinion in constant mesh with a pinion associated with the driven shaft through a coupling device, the driving and driven shafts being directly coupled during direct drive and the coupling device being disengaged to allow the lay shaft to remain stationary during direct drive.

The object of the present invention is to provide a variable speed gear box in which both the removal of torque from the gear shaft as a preliminary to each gear change and the idle condition of the lay shaft during direct drive are obtained and in which noise during gear changing is largely eliminated to improve the efficiency of the construction.

A still further object is to provide an improved construction of gear box including a friction clutch wherein the direct drive through the box is provided independent of said friction clutch.

In accordance with the present invention a cam device is associated with the gear shift lever and operably connected with the said cam device is a friction clutch located in the transmission, the arrangement being such that change of position of the gear shift lever effects either a transitory or a continuous disengagement of said friction clutch, and thereby either a temporary or continuous interruption of the transmission according as the lever is bringing in a direct or indirect drive, so that during intermediate gear selection the elements of the gear are freed from torque while a change to direct drive enables the lay shaft to remain idle throughout the period of the drive.

The friction clutch employed may be of the nature above referred to and disclosed in Farley's application Serial No. 183,867, filed April 14, 1927, and may be incorporated in the transmission, say at the rear of the gear box, so as to be readily operable by the gear shift lever, the registering means by which the cages are controlled being connected to said gear shift lever so as to be actuated thereby to withdraw the wedging members from coupling position reparatory to a gear change.

Conveniently, the gear shift lever has associated with its shaft a cam which engages a movable lever linked to the registering means, and which is provided with a plurality of protuberances or cam surfaces arranged in such a manner that one or more protuberances are effective during any change from one intermediate gear ratio to another to cause a transitory movement of the movable lever and thereby of the registering means, which accordingly operate the cages to temporarily withdraw the wedging members from coupling position with consequent interruption of transmission through the clutch, while another of the protuberances, during direct drive, maintains the movable lever in a predetermined position throughout the drive, so that a continuous withdrawal of the wedging members from coupling position and a continuous interruption of transmission during the period of direct drive is effected.

Reference will now be made to the accompanying drawings for a more detailed description of the invention which is shown applied to a gear box including a friction clutch in the preferred form.

Figure 1:
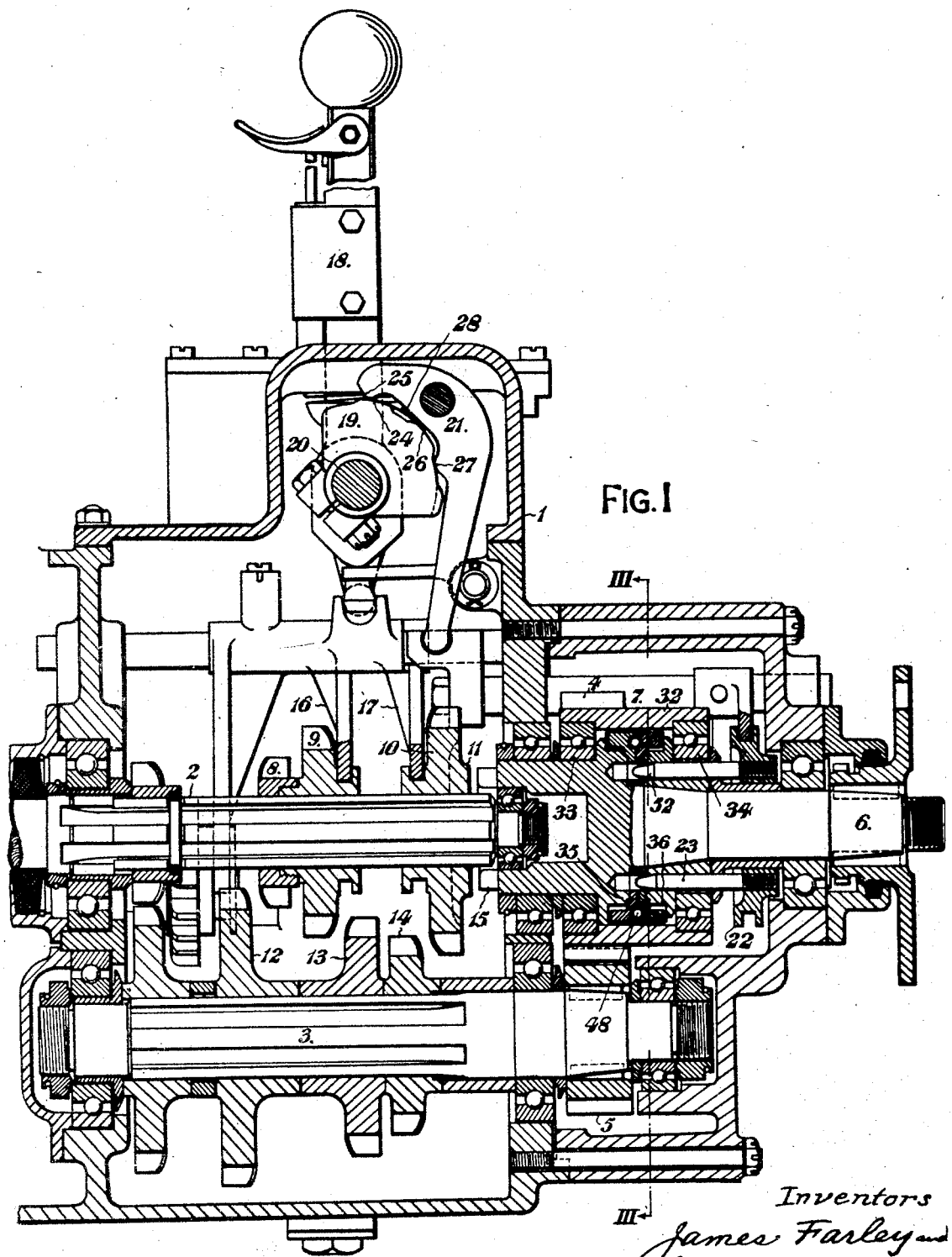
Fig. 1 is a vertical section of the gear box of the motor vehicle modified to include the features of the present invention.

Referring now to the drawings, but first more particularly to Fig. 1, a casing as customarily provided on motor vehicles for the gear mechanism, is generally designated 1 and mounted thereon is an engine driven primary or jack shaft 2 and a parallel lay shaft 3, both shafts being shown mounted in the gear casing 1 on ball bearings.

The gear box as illustrated has its constant mesh pinions 4, 5, located at the rear of the box, the pinion 4 being mounted at the head of the transmission or Cardan shaft 6 and being associated therewith through an interposed friction clutch generally designated 7, and operable to couple or uncouple the pinion 4 to its shaft at the will of the operator.

On the primary shaft 2, three sliding gears 8, 9 and 10 are arranged for the first, second and third intermediate ratios respectively, and a set of top gear dogs 11, corresponding pinions 12, 13 and 14 being mounted on the lay shaft 3 for the respective intermediate gears and co-operating dogs 15 on the transmission or Cardan shaft 6 for the direct drive, engagement of any required gear ratio being had at the instance of selectors 16, 17 operated from the gear shift lever 18.

To effect the interruption of transmission through the gear box necessary to permit both gear engagement without torque in the parts idle rotation of the lay shaft 3 during direct drive, a cam device 19 is associated with the gear shift lever 18 by being mounted on its rocker shaft 20 and operating a crank lever 21 which controls the friction clutch 7 by means of an axially movable control ring 22, the axial displacement of which regulates the nature of the connection between the constant mesh pinion 4 and the transmission or Cardan shaft 6.

In the arrangement shown register pins 23 are arranged on the control ring 22 which is fixed for rotation with the Cardan shaft and when the pins 23 are projected by movement of the control ring 22 to the left as in Fig. 1 the clutch 7 is uncoupled so that the constant mesh pinion 4 is free to rotate relatively of the shaft 6 as hereafter described. By the cam mechanism 19 associated with the gear shift lever 18 this condition of affairs temporarily prevails as a preparatory to each gear change movement of the gear shift lever from one gear engaged position to another causing the protuberance or peak 24 of the cam 19 to bear on the abutment 25 of the lever 21 which is thereby oscillated drawing the control ring 22 to the left to uncouple the clutch 7, re-coupling of the clutch being again effected when the gear selection has been made.

To prevent any tendency of the lever 21 to rock and to render control of the clutch by the ring 22 positive a second projection or peak 26 is arranged on the cam 19 on which bears a second abutment 27 on the lever 21 and as will be seen the contour of the cam 19 is so arranged that both abutments 25 and 27 are always in contact and thus the position of the lever 21 always fixed for any position of the gear shift lever 18.

In order that the lateral traverse of the gear shift lever 18 for different gear ratios may be provided for, the cam 19 is arranged sufficiently wide so that the protuberance 24 is engaged by the lever 21 in all intermediate gear ratio positions of the gear shift lever, thus in the neutral position, as shown in the drawings, and on each movement thereof through neutral to effect an intermediate gear selection, the register pins 23 are thrown into a position in which the controlling cages of the preferred form of clutch hereinafter described are withdrawn to cause removal of the wedging members of the clutch from coupling position so that transmission between the Cardan and lay shafts is interrupted and consequently torque removed from the gear shafts as a preliminary to each gear engagement.

During direct drive it is desirable that the lay shaft 3 should remain stationary, so that wear is reduced to a minimum, and accordingly the cam 19 is provided with a continuous plane surface forming a further protuberance 28, which is engaged by the lever 21 in the direct drive or top gear position only of the gear shift lever 18, thus, as the gear lever 18 moves through neutral to the direct drive the control ring 22 is moved to the left, thereby disengaging the clutch which is maintained disengaged throughout the period of the drive by the fact of the protuberance 28 keeping the control ring 22 continuously in the left-hand position, and therefore the lay shaft 3 is allowed to remain stationary while the vehicle is in top gear.

For direct drive, transmission is taken through the top gear dogs 11 and 15 so that the primary shaft 2 and the Cardan or transmission shaft 6 rotate solidly and by maintaining the friction clutch 7 open and the pinion 4 free of its shaft, idle rotation of the lay shaft 3 during direct drive, as customarily present in the gear boxes of motor vehicles, is eliminated and a considerable economy effected by reducing the friction and increasing the durability of the components of the gear box.

In the aforementioned description the friction clutch 7 has been described as controlled from the ring 22 by register pins 23 as in Farley's application Serial No. 183,867, but the preferred form of clutch employed comprises the features now to be described with reference also to Figs. 2 and 3.

As will be seen more readily from Fig. 1 the constant mesh pinion 4 comprises an annulus or cylinder 32 mounted to rotate freely on ball races 33 and 34 of the transmission or Cardan shaft 6. Between the ball races 33 and 34 the transmission shaft 6 is provided with a polygonal section in the form of a decagon in two parts 35 and 36 and between the faces of the decagons 35 and 36 and the inner cylindrical face 37 of the cylinder 32 are located two series of rollers 38 and 39 constituting the wedging members of the clutch and located respectively in cages 40 and 41.

The cages 40 and 41 are arranged with inwardly projecting flanges 42 and 43 which occupy an annular recess between the two decagons 35 and 36, and perforations 44 are arranged in the flange 42 and perforations 45 in the flange 43 which, co-operating with the register pins 23, serve for the control of the cages 40 and 41 and consequently the condition of the clutch 7.

Figure 2:
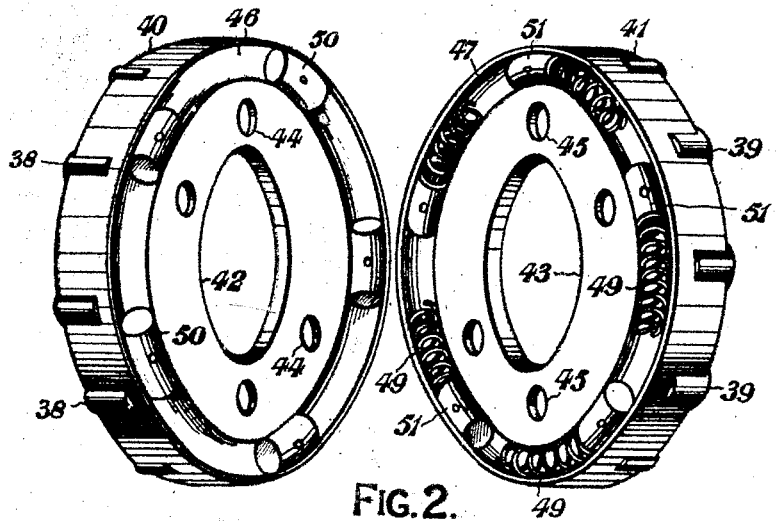
Fig. 2 is a perspective view of the cages carrying the rollers constituting the coupling members of the preferred form of friction clutch.

Referring now more particularly to Fig. 2, it will be seen that the abutting faces of the cages 40 and 41 are provided with semicircular recesses 46 and 47 which together form circular housing 48, Fig. 1, for a series of springs 49 normally urging the cages 40, 41 with their wedging members 38, 39 to coupling position.

Abutments 50 in the cage 40 and 51 in the cage 41 are arranged in the recesses 46 and 47 respectively and the springs 49 operate between these abutments which are also arranged to serve as stops limiting the angular displacement of the cages 40 and 41 under the influence of the springs 49, and being so dimensioned that the rollers 38 and 39 of both cages do not assume a gripping position at one and the same time.

If stops were not provided limiting the angular displacement of the cages 40, 41, both series of rollers 38 and 39 would be forced by the springs 49 into a wedged position and declutching would be rendered exceptionally difficult owing to the jamming action produced.

Control of the cages 40, 41 is effected as already mentioned by the register pins 23, which for this purpose are provided with tapered ends 52 co-operating with the perforations 44, 45 in the cage flanges 42 and 43. When projected by movement of the control ring 22 to the left so that the major section of the pins 23 occupies the perforations 44 and 45 the perforations are registered and the springs 49 compressed so that the rollers 38 and 39 are withdrawn from coupling position to a mid position on the faces of the decagons 35 and 36 respectively.

In this condition the constant mesh pinion 4 is free of the transmission or Cardan shaft 6 but coupling can be immediately restored by withdrawal of the register pins 23 when the perforations 44 and 45, riding the tapered ends 52 of the register pins 23, the springs 49 urge the cages 40, 41 to a position in which the rollers become wedged and take up the drive.

Figure 3:
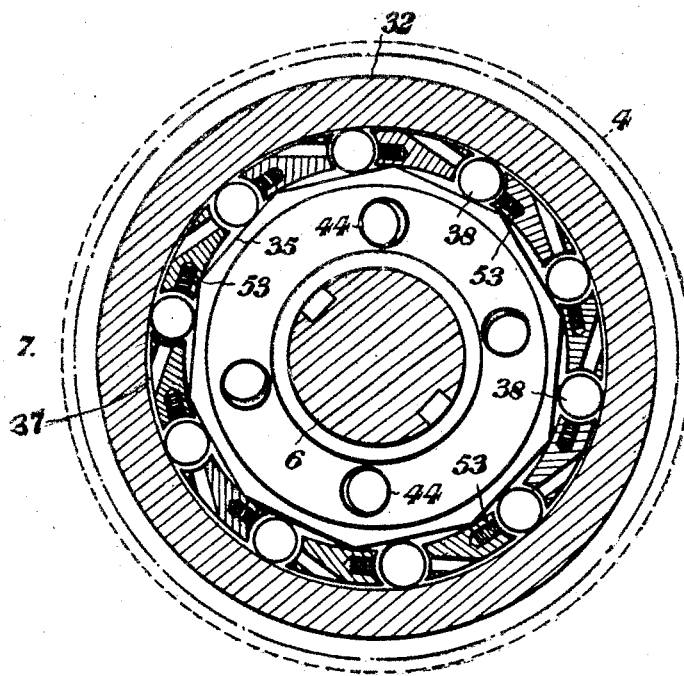
Fig. 3 is a section on the line III—III of Fig. 1.

A construction of cage is clearly shown in Fig. 3 where each roller 38 is spring loaded at 53 so that an even distribution of the strain is obtained throughout the series of rollers and any inaccuracies in manufacture compensated by permitting each roller to assume its wedged position with a slight resilient movement in regard to the cage 40.

In the example illustrated the friction clutch is arranged to completely uncouple the Cardan shaft 6, but as in all ordinary circumstances when effecting a change of gear ratio on a motor vehicle, the main engine clutch is uncoupled and with the vehicle in motion the Cardan shaft 6 will overrun, and consequently the friction clutch 7 may be arranged so as to be uncoupled unidirectionally only, that is, so as to simply permit the Cardan shaft 6 to overrun but to take up the drive immediately on the speed of the pinion 4 attaining and surpassing the speed of the Cardan shaft 6.

As will be seen, apparatus according to the invention, wherein a friction clutch is operable to interrupt transmission during intermediate ratios, while allowing direct drive to be effected independently thereof, in addition to rendering gear change on a motor vehicle free from difficulty and the possibility of noisy selection, increases the durability of the gear box, and by eliminating the necessity for rotating the lay shaft during direct drive effects considerable economy as regards the wear on the bearings, and the consumption of lubricant.

Further by the arrangement described wherein the friction clutch is incorporated in the gear box, the direct drive for top gear is operative independent of the friction clutch so that in the unlikely event of the friction clutch failing, transmission can still be effected and the vehicle driven.

What we claim is:

1. Transmission mechanism including a variable speed gear, a gear shift lever operable to select any desired drive, and a lay shaft in said gear for effecting drive during any intermediate gear ratio, in combination with a friction clutch operable to interrupt transmission through the gear during intermediate ratios while allowing direct drive to be effected independently thereof, and clutch actuating means controlled by said gear shift lever for operating said friction clutch, said clutch actuating means being adapted to cause temporary disengagement of said friction clutch during any change from one intermediate gear ratio to another for removing torque from the gear shafts as a preliminary to each gear selection and a continuous disengagement of said friction clutch during the period of direct drive for allowing said lay shaft to remain stationary during the direct drive.

2. Transmission mechanism including a variable speed gear, a gear shift lever operable to select any desired drive, and a lay shaft in said gear for effecting drive during any intermediate gear ratio, in combination with a friction clutch operable to interrupt transmission through the gear during intermediate ratios while allowing direct drive to be effected independently thereof, and a cam device associated with the gear shaft lever for controlling the operation of the clutch, said cam device being adapted to cause temporary disengagement of said friction clutch during any change from one intermediate gear ratio to another for removing torque from the gear shafts as a preliminary to each gear selection and a continuous disengagement of said friction clutch during the period of direct drive for allowing said lay shaft to remain stationary during the direct drive.

3. Transmission mechanism including a variable speed gear, a gear shift lever operable to select any desired drive, a lay shaft in said gear for effecting a drive during any intermediate gear ratio, a friction clutch interposed in said gear so as to interrupt transmission therethrough when open during intermediate ratios while allowing direct drive to be effected independently thereof, a cam device associated with said gear shift lever, a plurality of protuberances on said cam device, and a link mechanism interposed between said cam device and said friction clutch, one or more of protuberances effecting through said link mechanism a temporary disengagement of said friction clutch during any change from one intermediate gear ratio to another for removing torque from the gear shafts as a preliminary to each gear selection, and another of said protuberances being operative only in the direct drive position of the gear to maintain the said friction clutch continuously disengaged during the period of direct drive for allowing said lay shaft to remain stationary during direct drive.

4. Transmission mechanism including a variable speed gear, a gear shift lever operable to select any desired drive, a lay shaft in said gear for effecting drive during any intermediate gear ratio, a friction clutch employing wedging members and operable to interrupt transmission through said gear during intermediate ratios while allowing direct drive to be effected independently thereof, and a cam drive associated with said gear shift lever for controlling the operation of the clutch, said cam device being adapted to cause temporary disengagement of said friction clutch during any change from one intermediate gear ratio to another for removing torque from the gear shafts as a preliminary to each gear selection and a continuous disengagement of said friction clutch during the period of direct drive for allowing said lay shaft to remain stationary during the direct drive.

5. Transmission mechanism including a driving shaft, a driven shaft and a lay shaft, gear wheels on said shafts serving to connect said driving and driven shafts, a gear shift lever moving said gears axially to effect engagement and disengagement, a friction clutch connecting one of said gears to its shaft and operable to interrupt transmission through the mechanism during intermediate ratios only and clutch actuating means for said friction clutch controlled by said gear shift lever, said clutch actuating means being adapted to cause temporary disengagement of said friction clutch during any change from one intermediate gear ratio to another for removing torque from the gear shafts as a preliminary to each gear selection and a continuous disengagement of said friction clutch during the period of direct drive for allowing said lay shaft to remain stationary during the direct drive.

6. Transmission mechanism including a driving shaft, a driven shaft and a lay shaft, gear wheels on said lay shaft, constant mesh pinions connecting said lay and driven shafts, gear wheels on said driving shaft, a gear shift lever to move the gear wheels on the driving and lay shafts into engagement, a friction clutch controlled from the gear shift lever and interposed between one of said constant mesh pinions and its associated shaft and means for directly connecting said driving and driven shafts to obtain direct drive independently of said friction clutch, said friction clutch being operable during any change from one intermediate gear ratio to another to temporarily disengage said constant mesh pinion from its associated shaft for removing torque from the gear shafts as a preliminary to each gear selection and during direct drive to continuously disengage said constant mesh pinion from its associated shaft throughout the period of direct drive to allow the said lay shaft to remain stationary during the direct drive.

7. Transmission mechanism including a driving shaft, a driven shaft and a lay shaft, gear wheels fixedly mounted on said lay shaft, constant mesh pinions connecting said lay and driven shafts, slidable gear wheels on said driving shaft, a gear shift lever to move said slidable gear wheels into engagement with said lay shaft gear wheels, a friction clutch interposed between the driven shaft and its constant mesh pinion, clutch actuating means controlled by said gear shift lever for operating said friction clutch, and means for directly connecting said driving and driven shafts to obtain direct drive, said clutch actuating means being adapted to cause a transitory operation of said friction clutch during any change from one intermediate ratio to another to effect a temporary disengagement between the driven shaft and its constant mesh pinion for removing torque from the shafts as a preliminary to each gear selection, and a continuous operation of said friction clutch during direct drive to effect a continuous disengagement between said driven shaft and its constant mesh pinion during the period of direct drive for allowing said lay shaft to remain stationary during said period.

8. Transmission mechanism including a driving shaft, a driven shaft and a lay shaft, gear wheels on said lay shaft, constant mesh pinions connecting said lay and driven shafts, gear wheels on said driving shaft, a gear shift lever to move said gear wheels on the driving and lay shafts into engagement, a friction clutch interposed between one of said constant mesh pinions and its associated shaft, a cam device associated with said gear shift lever, reciprocating means controlled by said cam device for operating said friction clutch and means for directly connecting said driving and driven shafts to obtain direct drive, said cam device being adapted through said reciprocating means to cause a transitory operation of said friction clutch during any gear change from intermediate ratio to another to effect a temporary disengagement between the clutch constant mesh pinion and its associated shaft for removing torque from the gear shafts as a preliminary to each gear selection, and a continuous operation of said friction clutch during direct drive to effect a continuous disengagement between said clutch constant mesh pinion and its associated shaft throughout the period of direct drive for allowing said lay shaft to remain stationary during said period.

9. Transmission mechanism including a driving shaft, a driven shaft and a lay shaft, gear wheels on said lay shaft, constant mesh pinions connecting said lay and driven shafts, gear wheels on said driving shaft, a gear shift lever to move said gear wheels on the driving and lay shafts into engagement, a friction clutch interposed between one of said constant mesh pinions and its associated shaft, a cam device associated with said gear shift lever, a plurality of protuberances on said cam device, reciprocating means for operating said friction clutch and adapted to engage with said protuberances on said cam device and means for directly connecting said driving and driven shafts to obtain direct drive, one or more of said protuberances effecting through said reciprocating means a transitory operation of said friction clutch during any change from one intermediate gear ratio to another to cause a temporary disengagement between the clutch constant mesh pinion and its associated shaft for removing torque from the gear shafts as a preliminary to each gear selection and another of said protuberances effecting a continuous operation of said friction clutch during direct drive to cause a continuous disengagement between said clutch constant mesh pinion and its associated shaft throughout the period of direct drive for allowing the lay shaft to remain stationary during said period.

10. Transmission mechanism including a driving shaft, a driven shaft and a lay shaft, gear wheels fixedly mounted on said lay shaft, constant mesh pinions connecting said lay and driven shafts, slidable gear wheels on said driving shaft, a gear shift lever to move said slidable gear wheels into engagement with said lay shaft gear wheels, means controlled by said gear shift lever for directly connecting said driving and driven shafts to obtain direct drive, a friction clutch interposed between the driven shaft and its constant mesh pinion, a cam device associated with said gear shift lever, a pivoted bell crank lever engaging with said cam device, an axially movable collar controlling the operation of said friction clutch and displaceable by said pivoted bell crank lever, a protuberance on said cam device operative during any gear change from one intermediate ratio to another for causing said bell crank lever to reciprocate said axially movable collar in reverse directions during the said gear change to effect a transitory operation of said friction clutch and a temporary disengagement between the driven shaft and its constant mesh pinion for removing torque from the gear shafts as a preliminary to each gear selection, and a further protuberance on said cam device operative only in the direct drive position to cause said bell crank lever to reciprocate said axially movable collar in one direction only to effect a continuous operation of said friction clutch and a continuous disengagement between said driven shaft and its constant mesh pinion throughout the period of direct drive for allowing said lay shaft to remain stationary during direct drive.

In testimony whereof we affix our signatures.

JAMES FARLEY.
JOSEPH MAINA.